July 6, 1937.  W. SCHWEMLEIN ET AL  2,086,304

BEARING MOUNTING

Filed March 25, 1937  2 Sheets-Sheet 1

Inventor
WILLIAM SCHWEMLEIN
HAROLD W. RAMEY

By C. R. Parker
Attorney

July 6, 1937.  W. SCHWEMLEIN ET AL  2,086,304
BEARING MOUNTING
Filed March 25, 1937   2 Sheets-Sheet 2
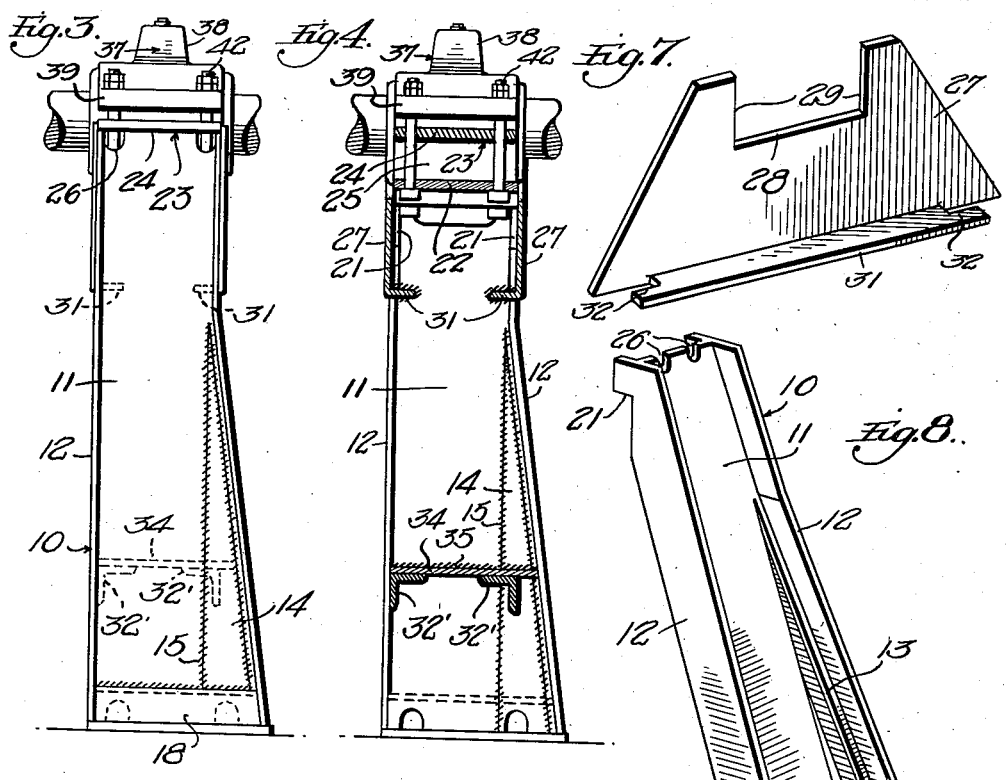
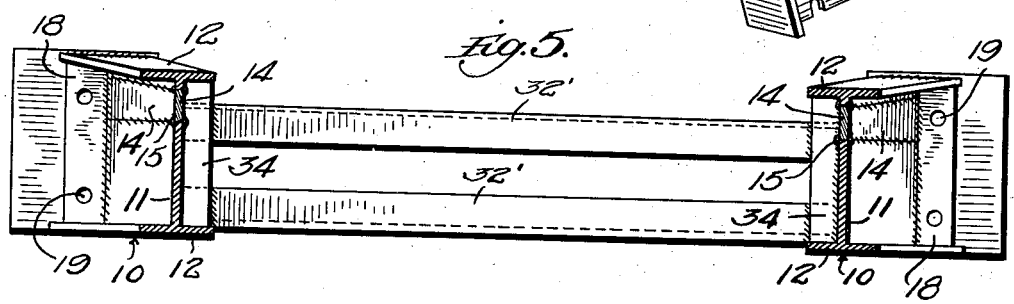
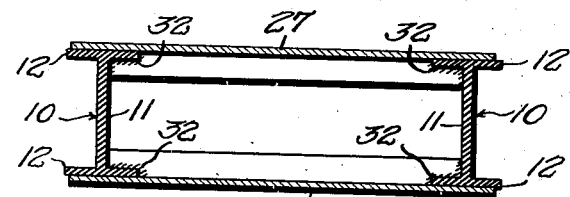
Inventor
WILLIAM SCHWEMLEIN
HAROLD W. RAMEY
By
Attorney Patented July 6, 1937

2,086,304

UNITED STATES PATENT OFFICE 2,086,304

BEARING MOUNTING

William Schwemlein and Harold W. Ramey, Parkersburg, W. Va., assignors to The Parkersburg Rig & Reel Company, Parkersburg, W. Va., a corporation of West Virginia Application March 25, 1937, Serial No. 133,040

16 Claims. (Cl. 308—25)

This invention relates to bearing supports, and more particularly to a jack post structure for use in oil well pumping apparatus.

In the earlier forms of oil well pumping apparatus, wherein pumping is effected by oscillation of a walking beam driven from a crank shaft by means of a pitman connection, it was the common practice to support the crank shaft in bearings mounted at the upper ends of wooden posts. What is known as "bridle irons" came into being with such earlier types of jack posts and consisted of various types of chains and rods for taking up various forces exerted during the operation of the pumping apparatus, such as the relatively heavy upward thrusts and other stresses in a plane at right angles to the axis of the crank shaft.

Jack post constructions were later improved by the provision of fabricated A-shaped posts having bearings mounted at their upper ends. These later types of structures employed bridle irons similar to the earlier types of constructions. The use of such bridle irons were made increasingly necessary as loads became heavier. Such bridle irons usually included two hold-down rods and four bolts securing the bearing cap in position, these elements being adapted to take up the upward thrusts. In addition, longitudinal movement of the crank shaft with respect to the jack post, that is, movement in a plane at right angles to the axis of the crank shaft, was restrained by means of turnbuckle braces secured at their ends respectively to the bearing box and the main supporting sill at an approximate angle of 45°.

Theoretically, all of the strains and stresses to which the crank shaft bearings are subjected properly should be taken up by the jack posts and their foundation means, and the bridle irons referred to constituted make-shift and unsatisfactory means for carrying loads which could not be borne by the jack posts. For example, it is uneconomical to provide separate means, such as hold-down rods provided with turnbuckles, to transmit the upwardly acting load to the foundation of the jack posts. This is true for the reason that the jack post legs have to be made of relatively heavy sections so as to prevent "weaving" of the structure. Therefore, such relatively heavy jack post construction should render unnecessary the provision of the separate means for carrying the upwardly acting load.

Moreover, with the older installations, there was always a great chance for the concentration of stresses on the bearing bolts or hold-down rods, and for this reason breakage of parts has always been quite frequent. In this connection, it will be noted that in structures of this character employing bridle irons, it has been necessary for an operator periodically to tighten up the bridle irons, which operation has been very inefficiently carried out because of the usual inability of an operator to properly and evenly tighten the turnbuckles, thus causing the uneven transmission of loads.

An important object of the present invention is to provide a novel type of jack post which is effective, without the use of separate bracing means, for carrying all of the loads and stresses to which a device of this character is subjected.

A further object is to provide a jack post structure wherein all of the vertically acting loads are transmitted between the bearing and the foundation through the jack post structure itself.

A further object is to provide a jack post structure wherein the elements which take up the upward thrusts of the crank shaft are directly connected between the bearing structure and the upper end of the jack post instead of employing hold-down rods or the like.

A further object is to provide a novel jack post construction wherein changes in the direction of the load do not operate to transfer the loads between different elements as in prior constructions, loads in all directions being taken up by the jack post itself.

A further object is to provide a jack post structure wherein thrusts at right angles to the axis of the jack post are transmitted directly into one leg of the jack post instead of being taken up by turnbuckle brace rods at the opposite side of the post.

A further object is to provide a jack post structure having its parts so formed and arranged as to receive a portion of the crank shaft bearing in its upper end with the axis of the crank shaft arranged at a level at least as low as the upper extremity of the jack post.

Other objects and advantages of the invention will become apparent during the course of the following description.

In the drawings we have shown one embodiment of the invention. In this showing,

Figure 3 is an edge elevation,

Figure 4 is a transverse vertical sectional view taken on line 4—4 of Figure 1,

Figure 5 is a horizontal sectional view on line 5—5 of Figure 1,

Figure 6 is a similar view on line 6—6 of Figure 1,

Figure 7 is a detail perspective view of a saddle plate, and

Figure 8 is a similar view of a partially completed jack post leg.

Figure 1:
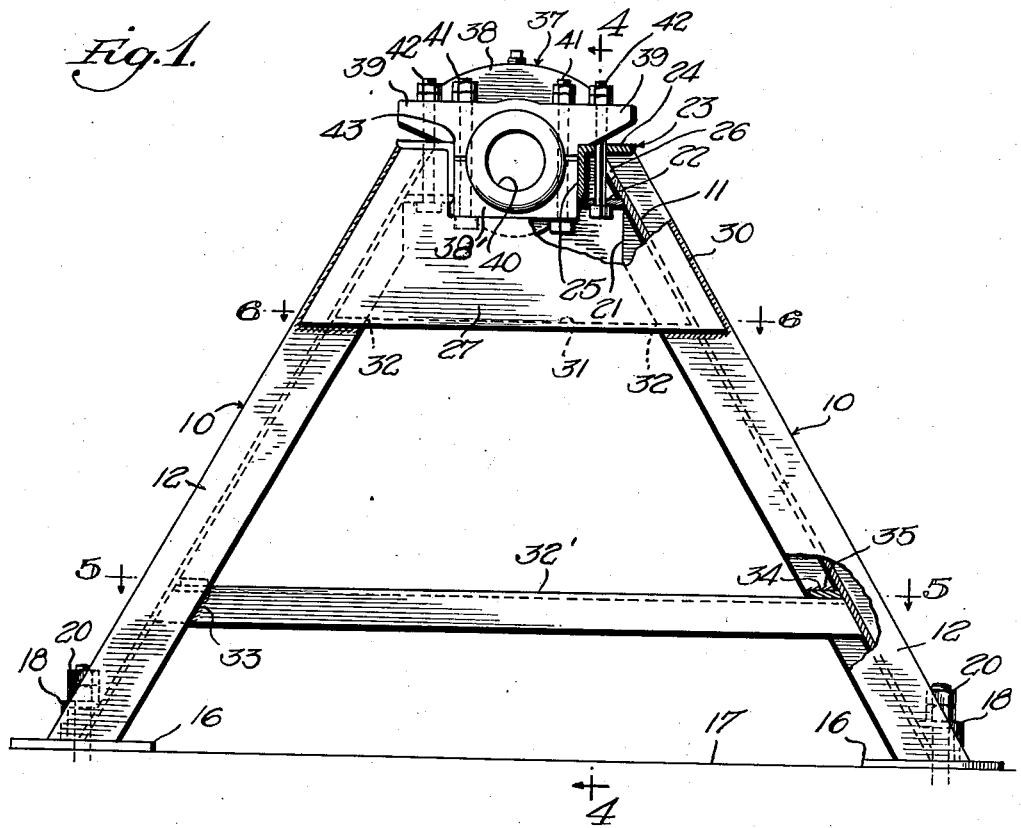
Figure 1 is a side elevation.
Figure 2:
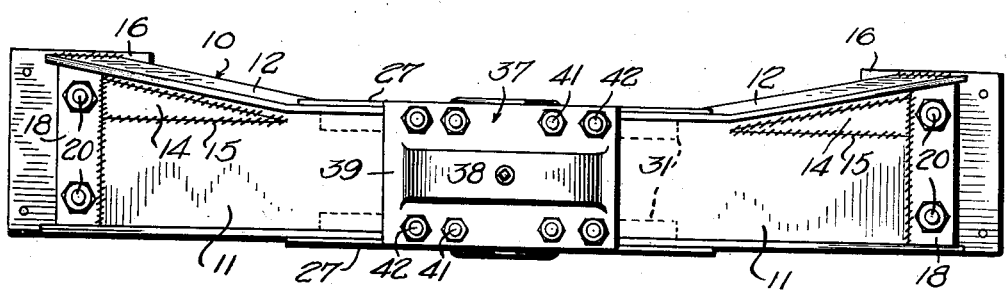
Figure 2 is a plan view.

Referring to Figure 1, the numeral 10 designates a pair of jack post legs preferably formed of structural steel of I beam section as shown in Figure 6, each beam structure including a web portion 11 and a pair of flanges 12. In forming each of the legs, the web portion 11 is cut from the lower end thereof adjacent one of the flanges 12, whereupon such flange portion is pulled outwardly to form a substantially V-shaped opening as indicated by the numeral 13 in Figure 8. A similarly shaped scarf plate 14 is then placed in the V-shaped opening and welded in position as at 15. Such an arrangement materially widens each leg at its lower end, as will be apparent.

The legs 10 are inclined with respect to each other to converge toward their upper ends as shown in Figure 1. The lower ends of the legs terminate in a common horizontal plane, and a base plate 16 is welded against the lower end of each leg to rest upon a suitable platform indicated by the line 17 in Figure 1. An anchor member 18, preferably of angular cross-section, extends between the flanges 12 of each leg 10 as shown in Figures 1, 2, 3, and 5. Each anchor member 18 contacts with the web 11 of its associated leg and with the associated base plate 16, the ends of each anchor member likewise contacting with the flanges 12. Each anchor member 18 is welded along its line of contact with each of the elements referred to. Thus it will be apparent that each anchor member 18 is adequately braced in position. Each of the anchor members is provided with bolt openings 19 (Figure 5) and bolts 20 pass through the openings 19 to secure the bottoms of the legs to the foundation structure.

Referring to Figure 8 it will be noted that the inner edge of each flange 12, adjacent the upper end of the leg 10, is right-angularly notched as at 21, the downwardly facing edge of each notch being parallel to the plane of the top of the leg. A plate 22 extends across the downwardly facing edges of the notches 21 of each leg and is welded in position as shown in Figure 1. An angle cap indicated as a whole by the numeral 23 is provided at the upper end of each leg 10, each of these caps having its horizontal flange 24 welded against the top of the leg and its depending flange welded against the inner edges of the flanges of the leg, such inner edges being cut vertically as shown in Figures 1 and 8. It will be apparent that the flanges 24 of the two angle caps 23 lie in a horizontal plane, and such flanges of the cap should be accurately so positioned. The depending flanges 25 of the two angle caps will be spaced apart and arranged parallel to each other, as will be apparent. The upper end portion of the web 11 of each leg is provided with a pair of notches 26 for a purpose to be described.

A saddle plate 27 is secured against each face of the post adjacent the upper end thereof and these plates overlie the flanges 12. One of the saddle plates is shown in detail in Figure 7, it being noted that the top of the saddle plate is notched as at 28 with opposite edges 29 of the notch spaced apart a distance approximately equal to the distance between the flanges 25 of the two angle caps 23. The inner faces of the saddle plates are welded to the ends of the angle caps 23, and the lower edges of the flanges 25 of such caps are welded to the plates 22. The latter elements have their inner edges welded to the lower edges of the flanges 25 and their remote edges welded to the webs 11 of the legs 10. The remote end portions of the saddle plates 27 lie against the outer faces of the flanges 12 and are welded thereto as at 30. Thus it will be apparent that all of the elements constituting the upper end portion of each jack post are rigidly fixed with respect to each other.

To add to the rigidity of the structure, each saddle plate 27 preferably is provided at its lower edge with an integral horizontal inwardly extending flange 31, the ends of which are notched as at 32 to receive the adjacent edges of the flanges 12 of the posts 10, the material forming the edges of the recess 32 being welded to the flanges 12.

At a point spaced from the bottom of the jack post, a pair of horizontal angle irons 32′ extend between the legs 10 and are welded to the flanges 12 as at 33. The end portions of the angle irons 32′ have their upper faces lying beneath transverse braces 34 extending between the flanges 12 of the legs and welded to the flanges 12 and to the webs 11 as at 35. Accordingly it will be apparent that without excess weight, the jack post structure presents an extreme degree of rigidity.

A bearing assembly is mounted at the top of the jack post and is indicated as a whole by the numeral 37. This bearing assembly is reversed with respect to the ordinary mounting of a two-part bearing, the upper section 38 having lateral extensions 39 overlying the horizontal flanges 24 of the angle caps 23. The other section 38′ of the bearing structure is arranged within the recess defined by the notches 28 of the saddle plates 27 and the inner faces of the depending flanges 25. The bearing structure is provided with the usual crank shaft bearing opening 40, and adjacent and outwardly of such opening, relatively heavy bolts 41 pass through the bearing sections 38 and 38′ to secure them to each other, as will be apparent. Outwardly of the bolts 41, relatively heavy bolts 42 extend through the lateral extensions 39, and downwardly through the horizontal flanges 24 and plates 22, the heads of such bolts lying beneath and engaging the lower faces of the plates 22 as shown in Figures 1 and 4. The notches 26 are provided in the webs 11 to provide space for the bolts 42.

As previously stated, the upper flanges 24 of the angle caps 23 should be accurately placed in a common horizontal plane, and the inner edges of the angle caps 23 likewise must be accurately arranged in parallel relation. Inwardly of the lateral extensions 39, the bearing cap 38 is angled as at 43 to receive the upper inner extremities of the angle caps 23, such portions of the angle caps forming seats for the bearing structure as will be apparent.

The operation of the device will be apparent from the foregoing description. In the conventional jack post construction, the jack post itself acts purely as a compression member to take up downward vertical thrusts. The upwardly acting load, in an oil well pumping apparatus of the character referred to, is heavier than the downwardly acting load, and is ordinarily taken up by means of vertical tension rods secured at their upper ends to the bearing assembly and at their lower ends to the jack post foundation. Other loads at right angles to the axis of the crank shaft, that is, longitudinally with respect to the jack post, ordinarily have been taken up by the other elements of the bridle iron assembly, namely, the angular rods provided with turnbuckles. Such angular rods ordinarily have had their upper ends secured to the bearing assembly and their lower ends connected to hooks secured to the jack post foundation.

Since it has been necessary to make the jack post structures relatively heavy to withstand downward thrusts and the "weaving" to which a device of this character is subjected in operation, the use of the vertical tension members has been uneconomical, but the upward thrusts have been of such character that it has been impracticable in ordinary jack post structures to take care of such vertical thrusts without the use of the tension members referred to. Likewise, loads transmitted longitudinally with respect to the jack posts have had to be taken care of by the angular braces referred to for the reason that conventional jack posts have been unable to sustain such loads.

Prior formations of jack posts, therefore, have been quite expensive to manufacture and install, and they have become increasingly unsatisfactory as the loads to which they have been subjected have increased. There was a tendency in prior installations for the bolts and turnbuckles to become loosened in operation, thus requiring that they be tightened by available operators. Due to the inherent limitations of construction, it is practically impossible for the average operator or workman to properly tighten the turnbuckle braces and hold-down rods so that each element would be equally stressed within its limitations. The result has been that certain parts of the assembly were almost always overloaded, thus resulting in frequent failure of the parts.

The welded structure of the present invention has been found after extensive tests and numerous commercial installations to embody the structural strength necessary to withstand loads transmitted longitudinally of the jack post as well as vertical loads, and particularly the extremely heavy upwardly acting loads, without the use of any extraneous tensioning or bracing means of any character. In other words, the jack post is wholly self-contained without the use of vertical tension members or angular braces of the character previously employed. The present construction also possesses the inherent strength and bracing to withstand the "weaving" to which a structure of this character is constantly subjected.

Moreover, it will be apparent that the present construction eliminates the transferring of the loads from one element to another, as, for example, between the vertical tensioning members and the angular braces, all forces in the present structure being transmitted between the bearing structure and the base through the legs 10, which are effectively braced and fixed against movement of any character. The upper ends of the legs 10 are spaced apart to provide a recess for the lower bearing member 38', but the upper ends of the leg members are adequately braced with respect to each other by the saddle plates 27, angle caps 23 and plates 22. Accordingly it is possible to provide in the upper end of the post the recess referred to, which permits the axis of the crank shaft to be lowered with respect to the jack post, such axis, as shown in Figure 1, preferably being located at a level at least as low as the horizontal plane of the horizontal flanges 24. All thrusts and loads, are thus directly transmitted between the bearing assembly and the foundation 17 through the legs 10. Accordingly it will be apparent that the unitary jack post structure is both a compression and tension unit so far as vertical loads are concerned and that it likewise effectively takes care of all loads at an angle to the vertical.

In this connection it will be noted that in the older constructions, hold-down rods were commonly employed between the bearing assemblies and the foundations and as previously stated the hold-down rods usually were unequally tensioned. With the present construction, the upward thrust is taken by the bolts 42 which directly transmit the load to the foundation through the legs 10 and the heavy bolts 20. The bearing member 38 is designed to be snugly engaged by the cap members 23 in the angles 43, thus preventing any lost motion between the bearing assembly and the jack post.

From the foregoing, it will be apparent that the present construction provides, in effect, a unitary jack post structure which, through modern welding methods, may be comparatively cheaply manufactured. Material economy in manufacture and assembly is provided by the complete elimination of any extraneous tensioning or bracing means, the jack post in itself being adapted to withstand any loads which could be withstood by prior constructions with the bolts and turnbuckles thereof properly adjusted. Moreover, there are frequent overloading of bolts and turnbuckles in prior constructions due to unequal adjustment, and accordingly such prior constructions seldom were adapted to withstand the maximum loads for which they were designed. The present construction is not subject to such weakness of adjustment, and thus is always adapted to withstand the heavy loads for which it is designed. There are no adjustments which require skill or accuracy on the part of the operator to maintain the jack post at its highest degree of efficiency.

It is to be understood that the form of our invention herewith shown and described is to be taken as a preferred example of the same and that various changes in the shape, size and arrangement of parts may be resorted to without departing from the spirit of the invention or the scope of the subjoined claims.

We claim:

1. A bearing mounting comprising a pair of legs converging toward their upper ends and having such ends spaced from each other, means rigidly connecting said legs to each other, a horizontal cap of angular cross-section carried by the upper end of each leg and extending transversely of the plane of said legs, said caps having spaced parallel flanges to receive a portion of a bearing assembly therebetween and having horizontal bearing supporting flanges lying in a common plane, and means connected to said legs for securing a bearing assembly with respect thereto.

2. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, and means for securing a shaft bearing assembly with respect to said legs with a portion of such assembly arranged in said recesses and with the axis of the shaft opening in the bearing assembly at least as low as the upper extremities of said legs.

3. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, and bearing supporting members carried by the upper ends of the respective legs and having their adjacent portions arranged in spaced parallel relation to receive a portion of the bearing assembly therebetween.

4. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, bearing supporting members carried by the upper ends of the respective legs and having their adjacent portions arranged in spaced parallel relation to receive a portion of the bearing assembly therebetween, and means for securing the bearing assembly with respect to said legs.

5. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, and an angle cap secured to the upper end of each leg and extending transversely of the plane of said legs, said angle caps having depending parallel flanges spaced from each other to receive a portion of a bearing assembly therebetween, and having horizontal flanges lying in a common plane for supporting the bearing assembly.

6. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, an angle cap secured to the upper end of each leg and extending transversely of the plane of said legs, said angle caps having depending parallel flanges spaced from each other to receive a portion of a bearing assembly therebetween, and having horizontal flanges lying in a common plane for supporting the bearing assembly, and means for anchoring the bearing assembly with respect to said legs.

7. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, an angle cap secured to the upper end of each leg and extending transversely of the plane of said legs, said angle caps having depending parallel flanges spaced from each other to receive a portion of a bearing assembly therebetween, and having horizontal flanges lying in a common plane for supporting the bearing assembly, an anchoring plate carried by each leg adjacent its upper end, and means for securing the bearing assembly to said anchoring plates.

8. A bearing mounting comprising a pair of legs converging toward their upper ends and having such ends spaced from each other, saddle plates secured against opposite faces of said legs adjacent the upper ends thereof and provided with upwardly opening recesses substantially equal in width to the space between the upper ends of said legs, an angle cap secured to the upper end of each leg and extending transversely of the plane of said legs, said angle caps having depending parallel flanges spaced from each other to receive a portion of a bearing assembly therebetween, and having horizontal flanges lying in a common plane for supporting the bearing assembly, an anchoring plate carried by each leg below and parallel to the horizontal flange of the corresponding angle cap, and bolts passing through the bearing assembly and through said horizontal flanges and said anchor plates.

9. A bearing mounting comprising a pair of legs lying in a vertical plane and each formed of I-beam section, said legs converging toward their upper ends and having their upper and lower ends terminating in spaced parallel planes, the upper ends of said legs being spaced from each other, and an angle cap secured to the inner upper extremity of each leg, said angle caps having depending parallel flanges spaced from each other and secured against the inner upper extremities of said legs, said angle caps further including horizontal bearing supporting flanges lying in a common horizontal plane.

10. A bearing mounting comprising a pair of legs lying in a vertical plane and each formed of I-beam section, said legs converging toward their upper ends and having their upper and lower ends terminating in spaced parallel planes, the upper ends of said legs being spaced from each other, an angle cap secured to the inner upper extremity of each leg, said angle caps having depending parallel flanges spaced from each other to receive the lower portion of a bearing assembly therebetween, said angle plates further including horizontal flanges lying in a common plane for supporting the bearing assembly, and saddle plates secured against opposite faces of said legs adjacent the upper ends thereof and provided with upwardly opening recesses in their upper edges for receiving said portion of the bearing assembly.

11. A bearing mounting comprising a pair of legs lying in a vertical plane and each formed of I-beam section, said legs converging toward their upper ends and having their upper and lower ends terminating in spaced parallel planes, the upper ends of said legs being spaced from each other, an angle cap secured to the inner upper extremity of each leg, said angle caps having depending parallel flanges spaced from each other to receive the lower portion of a bearing assembly therebetween, said angle plates further including horizontal flanges lying in a common plane for supporting the bearing assembly, saddle plates secured against opposite faces of said legs adjacent the upper ends thereof and provided with upwardly opening recesses in their upper edges for receiving said portion of the bearing assembly, anchoring plates secured to said legs and to said saddle plates, and means for securing the bearing assembly to said anchoring plates.

12. A bearing mounting comprising a pair of legs converging toward their upper ends and having such ends spaced from each other, means rigidly connecting said legs to each other, a bearing assembly provided with a lower bearing member arranged between the upper ends of said legs and further provided with a cap having portions overhanging the upper ends of said legs, and means for securing said overhanging portions to said legs.

13. A bearing mounting comprising a pair of legs converging toward their upper ends and having such ends spaced from each other, means rigidly connecting said legs to each other, a bearing assembly provided with a lower bearing member arranged between the upper ends of said legs and further provided with an upper bearing member having portions overhanging the upper ends of said legs, spaced means carried by the upper ends of the respective legs to form a bearing support, and means for securing the overhanging portions of said bearing assembly with respect to said legs.

14. A bearing mounting comprising a pair of legs converging toward their upper ends and having such ends spaced from each other, means rigidly connecting said legs to each other, a bearing assembly comprising complementary upper and lower bearing members, said upper bearing member being provided with opposite extensions, said bearing assembly being supported by said legs with a portion of said upper bearing member arranged in the space between the upper ends thereof and with said extensions overhanging the upper ends of said legs, and means connected to said legs for anchoring said bearing assembly with respect thereto.

15. A bearing mounting comprising a pair of legs converging toward their upper ends and having such ends spaced from each other, means rigidly connecting said legs to each other, each of said legs having a bearing seat at the upper end thereof, each said seat having two bearing engaging portions angularly disposed with respect to each other, a lower bearing member arranged between said legs adjacent the upper ends thereof, and an upper bearing member having seating portions in fitting engagement with said bearing engaging portions of said bearing seats.

16. A jack post comprising a pair of legs converging toward their upper ends and having such ends spaced from each other, means rigidly connecting said legs to each other, and a cap and block bearing assembly, the cap of said bearing assembly having portions supported on and a portion arranged between the upper ends of said legs, the block of said bearing assembly being arranged in the space between the upper ends of said legs and being suspended from said cap.

WILLIAM SCHWEMLEIN.
HAROLD W. RAMEY.